United States Patent
Fukuda et al.

(10) Patent No.: US 7,471,600 B2
(45) Date of Patent: Dec. 30, 2008

(54) DATA RECORDING DEVICE

(75) Inventors: Katsuhiko Fukuda, Kato (JP);
Takanobu Kashiwagi, Kato (JP);
Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 11/146,265

(22) Filed: Jun. 6, 2005

(65) Prior Publication Data

US 2006/0187790 A1     Aug. 24, 2006

(30) Foreign Application Priority Data

Feb. 23, 2005   (JP)   ............................. 2005-047822

(51) Int. Cl.
*G11B 7/00*   (2006.01)
(52) U.S. Cl. .............. 369/47.28; 369/47.31; 369/47.48; 369/53.34; 369/59.19
(58) Field of Classification Search ............. 369/53.34, 369/47.11, 47.3, 47.33, 47.27, 47.18, 47.31, 369/47.28, 53.15, 59.19
See application file for complete search history.

(56) References Cited

U.S. PATENT DOCUMENTS 6,661,752 B2 *   12/2003   Eom ........................ 369/47.11
7,257,071 B2 *   8/2007   Kim et al. ................ 369/53.34

FOREIGN PATENT DOCUMENTS

JP   2000-173194   6/2000

* cited by examiner

*Primary Examiner*—Jorge L Ortiz Criado
(74) *Attorney, Agent, or Firm*—Greer, Burns & Crain, Ltd.

(57) ABSTRACT

The invention provides a data recording device comprising: an interval counter; an α counter; and a segment counter, wherein the interval counter and the α counter operate with a clock having a constant frequency which is independent of clock information, the interval counter is reset when division information is detected and, also, is reset and activates the α counter when it reaches a count value corresponding to a segment length, the α counter is reset when the division information is detected and, also, is reset and increments the count value of the segment counter when it reaches a count value corresponding to a predetermined length smaller than the segment length, and the segment counter increments its count value when the division information is detected and outputs a writing inhibition signal when it reaches a count value corresponding to the frame length.

21 Claims, 10 Drawing Sheets

DATA RECORDING DEVICE

CROSS-REFERENCE TO RELATED APPLICATION

This application is related to Japanese Patent Application No. 2005-47822 filed on Feb. 23, 2005, on the basis of which priority is claimed under 35 USC §119, the disclosure of this application being incorporated by reference in its entirety.

BACKGROUND OF THE INVENTION

1. Field of the Invention

The present invention relates to a data recording device for recording data using a synchronization clock generated on the basis of clock information formed on a recording medium.

2. Description of Related Art

A recording medium such as a magnetic disc or an optical disc is provided with a spiral track 100 as illustrated in FIG. 9, and fine clock marks (hereinafter, referred to as "fcms"), as well as data and address information, are recorded therein (recorded during data writing or preformatted) as clock information (see FIG. 10).

As illustrated in FIG. 9, a disc drive reads the fcms from the recording medium and generates fcm detection signals (hereinafter, referred to as "fcm_pls"). On the basis of the fcm_pls, a PLL circuit generates a synchronization clock (hereinafter, referred to as an "extclk") and, in synchronization therewith, signals are recorded and reproduced (refer to, for example, JP-A 2000-173194).

However, if there are flaws formed on a recording surface or contamination adhered to the recording surface due to some causes, they may cause the fcms to be detected at different positions from positions at which they are to be detected or to be undetected. This may cause a frequency of the extclk to be higher or lower than a predetermined frequency. Since the disc drive records and reproduces signals in synchronization with the extclk as previously described, when the frequency of the extclk is reduced below a predetermined frequency, recording beyond the end position of a frame (a unit recording region determined by a physical format of the medium; see FIG. 10) into a subsequent frame may occur, which may corrupt data in the subsequent frame.

To cope with this problem, it can be conceived to provide a counter which operates with a reference clock (hereinafter, referred to as a "rfclk") having a constant frequency such as a quartz oscillator or a synthesizer for knowing the end positions of frames and forcibly stop writing at the end positions of the frames to prevent corruption of data in the subsequent frame.

However, the two clock signals of the rfclk and the extclk are generated by different circuits; therefore, it is difficult to make their frequencies completely the same, thereby inducing frequency errors. Thus, there remains a problem that recording is stopped at a position beyond a frame, which degrades the accuracy of prevention of improper recording, in the case of using a medium having physical formats of large frame lengths and a disc drive.

SUMMARY OF THE INVENTION

The present invention has been achieved in view of the aforementioned circumstances and provides a data recording device capable of certainly stopping writing at end positions of frames even in the event of malfunctions of detection of clock information.

The present invention provides a data recording device for recording data using a synchronization clock generated on the basis of clock information formed on a recording medium. The data recording device comprises an interval counter, an $\alpha$ counter and a segment counter. Herein, the interval counter and the $\alpha$ counter operate with a clock having a constant frequency which is independent of the clock information. The interval counter is reset in terms of the count value when division information for dividing a frame into plural segments is detected and, also, is reset in terms of the count value and activates the $\alpha$ counter when it reaches a count value corresponding to a segment length. The $\alpha$ counter is reset in terms of the count value when the division information is detected and, also, is reset in terms of the count value and increments the count value of the segment counter when it reaches a count value corresponding to a predetermined length smaller than the segment length. The segment counter increments its count value when the division information is detected and outputs a writing inhibition signal when it reaches a count value corresponding to the frame length.

According to the present invention, each time when the division information is detected, the count value of the segment counter is incremented. When the division information is not detected, the interval counter and the $\alpha$ counter cooperate (the operation thereof will be described in detail later) to increment the count value of the segment counter. Therefore, even in the event of malfunctions of the detection of the division information due to dusts and the like adhered to a recording medium, the count value of the segment counter can be made equal to the number of division information to be detected. Thus, the present invention enables accurate determination of the number of division information. Consequently, when the count value of the segment counter reaches a value corresponding to the frame length, it is determined that the end position of the frame has been reached, and a writing inhibition signal is output for forcibly stopping the writing. This can prevent writing into the subsequent frame, thereby preventing corruption of data in the subsequent frame.

BRIEF DESCRIPTION OF THE DRAWINGS

The present invention will become more fully understood from the detailed description given herein below and the accompanying drawings which are given by way of illustration only, and thus are not limitative of the present invention and wherein.

Figure 1:
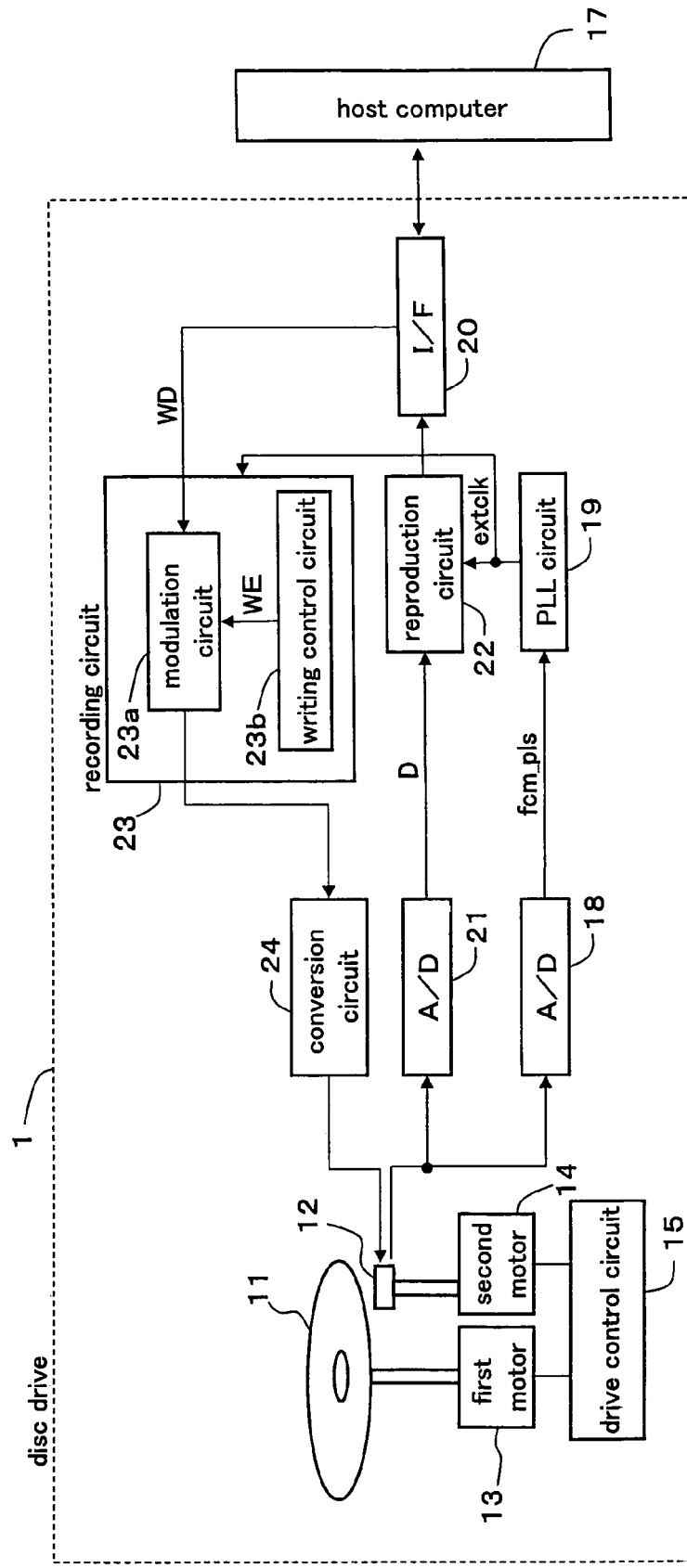
FIG. 1 is a block diagram of a disc drive according to the present invention.

DESCRIPTION OF THE PREFERRED EMBODIMENTS (First Aspect)

The present invention provides a data recording device for recording data using a synchronization clock generated on the basis of clock information formed on a recording medium, the data recording device comprising: an interval counter; an $\alpha$ counter; and a segment counter, wherein the interval counter and the $\alpha$ counter operate with a clock having a constant frequency which is independent of the clock information, the interval counter is reset in terms of the count value when division formation for dividing a frame into plural segments is detected and, also, is reset in terms of the count value and activates the $\alpha$ counter when it reaches a count value corresponding to a segment length, the $\alpha$ counter is reset in terms of the count value when the division information is detected and, also, is reset in terms of the count value and increments the count value of the segment counter when it reaches a count value corresponding to a predetermined length smaller than the segment length, and the segment counter increments its count value when the division information is detected and outputs a writing inhibition signal when it reaches a count value corresponding to the frame length.

According to the present invention, each time when the division information is detected, the count value of the segment counter is incremented. When the division information is not detected, the interval counter and the $\alpha$ counter cooperate (the operation thereof will be described in detail later) to increment the count value of the segment counter. Therefore, even in the event of malfunctions of the detection of the division information due to dusts and the like adhered to a recording medium, the count value of the segment counter can be made equal to the number of division information to be detected. Thus, the present invention enables accurate determination of the number of division information. Consequently, when the count value of the segment counter reaches a value corresponding to the frame length, it is determined that the end position of the frame has been reached, and a writing inhibition signal is output for forcibly stopping the writing. This can prevent writing into the subsequent frame, thereby preventing corruption of data in the subsequent frame.

The operation of the interval counter and the $\alpha$ counter will be described. The interval counter operates with a clock having a constant frequency and the count value thereof is reset each time when the division information is detected. Further, when the interval counter reaches a count value corresponding to the segment length, the interval counter is reset and activates the $\alpha$ counter. The $\alpha$ counter operates with a clock having a constant frequency, and the count value thereof is reset when the division information is detected. Further, when reaching a count value corresponding to a predetermined length shorter than the segment length, the $\alpha$ counter increments the count value of the segment counter. With this configuration, since the count value of the segment counter is incremented even in the event that the division information to be detected is not detected, the count value of the segment counter can be made equal to the number of division information to be detected.

The frequencies of the clocks for the operation of the interval counter and the $\alpha$ counter may be either equal or different. The term "increment" refers to incrementing the count value by a unit number (for example, by one) in the case of an up counter and refers to decreasing the count value by a unit number in the case of a down counter.

(Second Aspect)

The present invention also provides a data recording device for recording data using a synchronization clock generated on the basis of clock information formed on a recording medium, the data recording device comprising: an interval counter; and a segment counter, wherein the interval counter operates with a clock having a constant frequency which is independent of the clock information, the interval counter is reset in terms of the count value when division information for dividing a frame into plural segments is detected and, also, is reset in terms of the count value and increments the count value of the segment counter when it reaches a count value corresponding to a predetermined length which is greater than the length of a single segment and smaller than the length of two segments, and the segment counter increments its count value when the division information is detected and outputs a writing inhibition signal when it reaches a count value corresponding to the frame length.

(Effects and Advantages of Second Aspect)

The second aspect is different from the first aspect in that, when the interval counter reaches a count value corresponding to a predetermined length which is greater than the length of a single segment and smaller than the length of two segments, the count value thereof is reset and the count value of the segment counter is incremented. With this configuration, the count value of the segment counter can be made equal to the number of division information to be detected, provided that only single division information is dropped out.

(Description of Other Aspects)

The device according to the present invention may further comprise a format frame counter which operates with the synchronization clock and outputs a writing inhibition signal when it reaches a count value corresponding to the frame length. The device according to the present invention may further comprise a pattern recognition portion which recognizes a pattern indicating the end position of the frame and outputs a writing inhibition signal at the end position of the frame. In such cases, it is possible to properly restrict writing even in the event of malfunctions of the segment counter, or the like.

Preferably, the count value at which the $\alpha$ counter is reset is variable. In such a case, an optimum count value can be set in accordance with conditions such as the type of the format.

Preferably, the division information is clock information. Since the clock information is inevitably read for generating a synchronization clock and also is evenly spaced apart to divide the frame into plural segments, it is preferable that the clock information is utilized as the division information.

Also, it is possible to utilize, as the division information, specific patterns in the frame which enable position recognition. As well as the clock information, specific patterns in the frame which divides the frame into plural segments may be utilized as the division information.

Preferably, the count value corresponding to the frame length or the segment length is variable. By making the count values of the counters variable, they can be made adaptable to various types of formats.

Preferably, the division information is validly detected only during a time period in which the division information is expected to be detected. In this case, even if dusts and the like are wrongly detected as the division information outside of the time period in which the division information is expected to be detected, the detected signal will not be validated and thus the division information can be properly detected. Further, the time period in which the division information is expected to be detected has a certain width and, when more than one division information is detected during this time period, preferably, only the first-detected division information will be validly detected. This can prevent malfunctions due to dusts existing adjacent to the division information.

It is preferable that there is provided a function of recognizing the writing inhibition signal being output. By recognizing the inhibition signal being output, it is possible to determine whether or not the writing has been properly completed. If it is determined that the writing has not been properly completed, this can be addressed by rewriting or the like.

Figure 7:
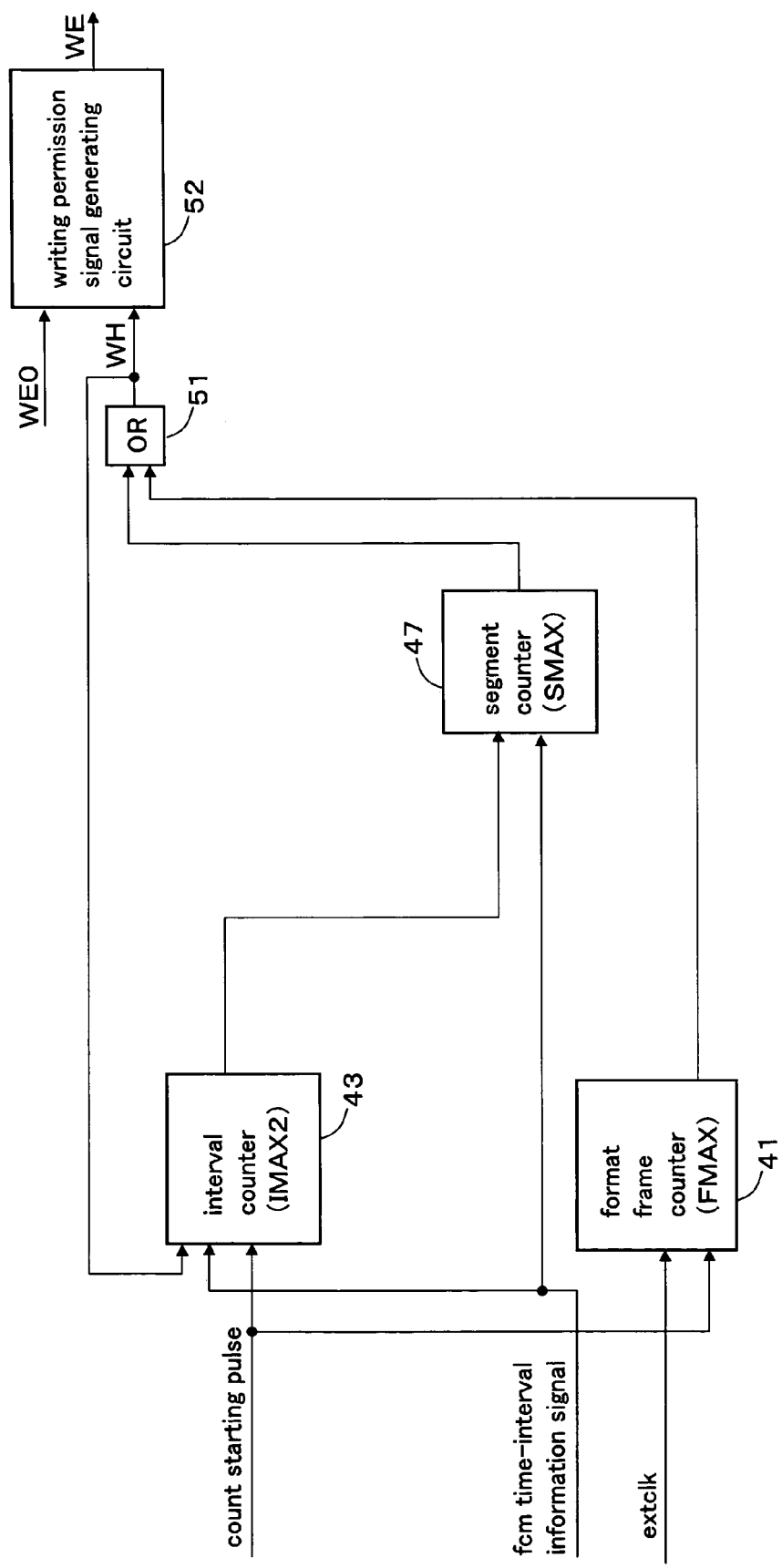
FIG. 7 is a block diagram of a writing control circuit according to a second embodiment of the present invention.
Figure 8:
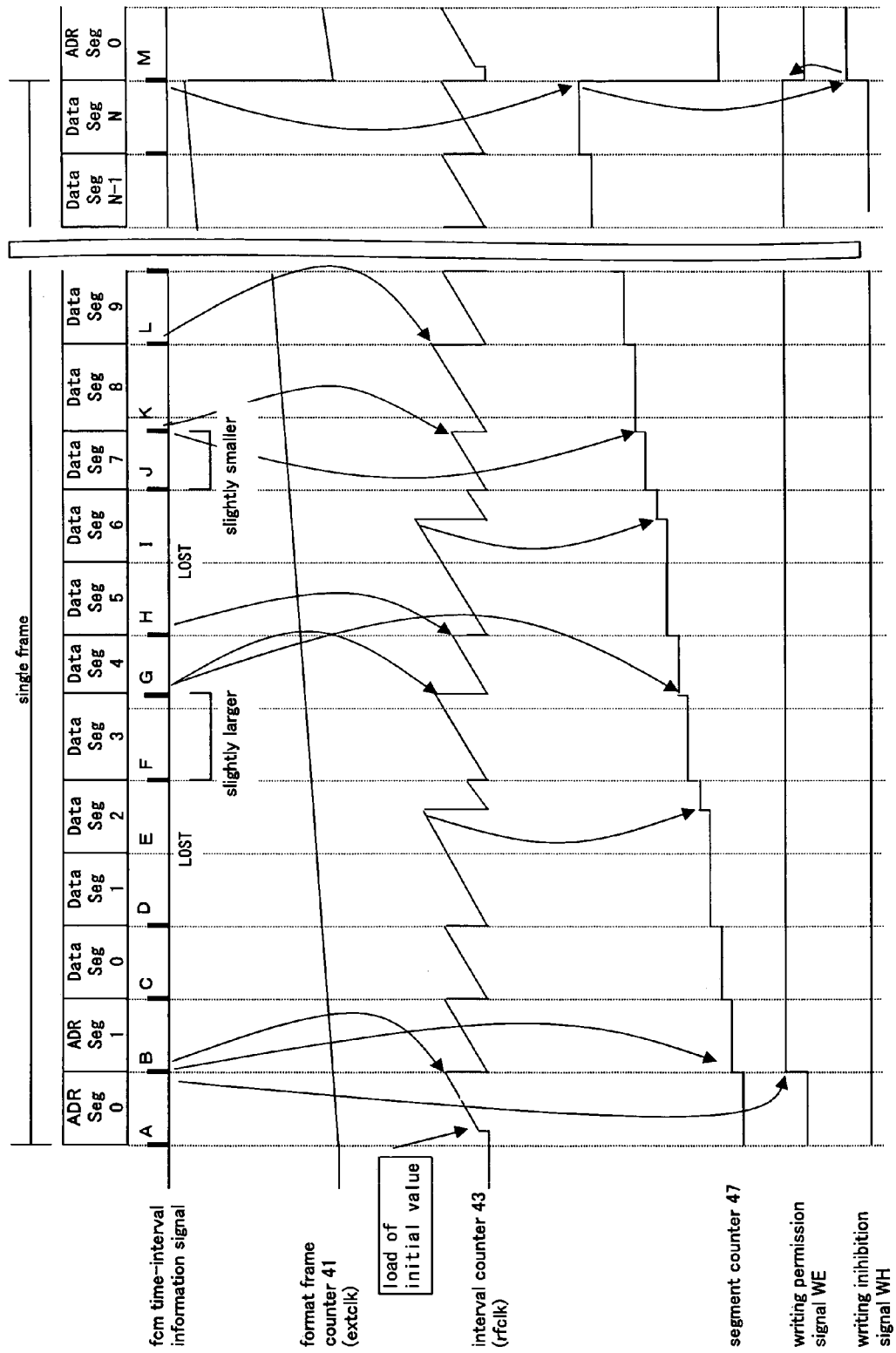
FIG. 8 is a timing chart of the writing control circuit according to the second embodiment of the present invention.
Figure 9:
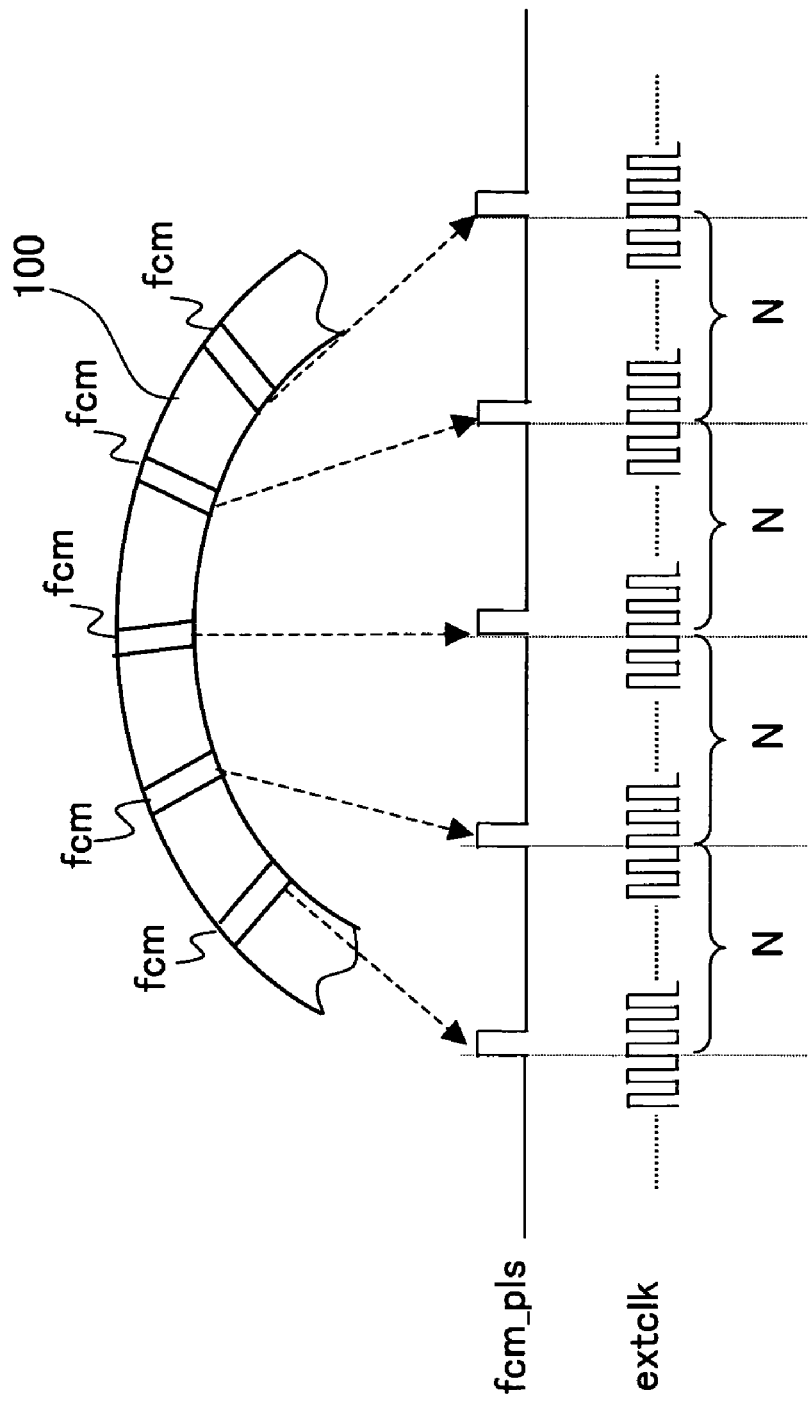
FIG. 9 is a diagram for illustrating effects of fcms and a PLL circuit, according to a related art.
Figure 10:
FIG. 10 is a diagram for illustrating periodic patterns of a physical format, according to a related art.

Hereinafter, with reference to FIGS. 1 to 8, there will be described embodiments of the present invention in which the present invention is embodied into a disc drive. An optical disc 11 according to this embodiment includes fcms which are spaced apart from one another by an equal angular interval as illustrated in FIG. 9, the fcms having been recorded during fabrication of the optical disc 11.

FIG. 1 illustrates a disc drive 1 and a host computer 17 for controlling the disc drive 1. The disc drive 1 reads and/or writes data from and/or into the optical disc 11 and includes a data reader and a data writer. The data reader and the data writer include a common head 12, a first motor 13 and a second motor 14, a drive control circuit 15, a CPU (not shown), a first A/D converter 18, a PLL circuit 19, and an input/output interface 20. The data reader includes a second A/D converter 21 and a reproduction circuit 22. The data writer includes a recording circuit 23 and a conversion circuit 24.

The optical disc 11 is mounted in the disc drive 1, and is driven at a constant rotation speed by the first motor 13. The head 12 is driven in a radial direction of the optical disc 11 by the second motor 14. The first and second motors 13, 14 are driven and controlled by the drive control circuit 15. The head 12 is controlled by a head control circuit (not shown) to perform the operation of writing data into the optical disc 11 or the operation of reading data from the optical disc 11. The drive control circuit 15 and respective functional blocks, such as the head control circuit, are controlled by the CPU. The CPU is controlled by command signals from the host computer 17 through the input/output I/F 20.

During the data writing operation and the data reading operation, the head 12 picks up fcms from the rotating optical disc 11 and outputs the signals to the first A/D converter 18 as an analog reference clock.

The first A/D converter 18 converts the analog reference clock input thereto into a binary value of "0" or "1" and outputs the signals to the PLL circuit 19 as fcm_pls (see FIG. 9).

The PLL circuit 19 generates an extclk which is generated based on the fcm_pls multiplied by a predetermined multiplication ratio N. Further, the PLL circuit 19 generates fcm time-interval information signals (which are the fcm_pls from which noise and pulse signals appeared at improper positions have been eliminated), using the fcm_pls and the extclk. This will be described in detail later.

The operation of reading data from the optical disc 11 will be described now. The second A/D converter 21 converts data recorded in the optical disc 11 (data other than fcms) into binary values and outputs the digital signals D to the reproduction circuit 22. In the optical disc 11 according to this embodiment, the fcms are recorded during fabrication thereof and the data other than the fcms is recorded later in a different form. As the first and second A/D converters 18 and 21, A/D converters suitable for the respective forms are employed. Thus, the first A/D converter 18 generates the fcm_pls on the basis of the fcms while the second A/D converter 21 generates the digital signals D on the basis of the data other than the fcms.

The reproduction circuit 22 according to this embodiment is constituted by a demodulation circuit. The reproduction circuit 22 reproduces the digital signals D (the data recorded in the optical disc), on the basis of the extclk from the PLL circuit 19. More specifically, the reproduction circuit 22 applies a known demodulating process to the digital signals D on the basis of the extclk, decodes the demodulated signals, and outputs the decoded signals to the host computer 17 through the input/output interface 20.

Next, the operation of writing data into the optical disc 11 will be described. During the data writing operation, write-target data WD is input from the host computer 17 to the recording circuit 23 through the input/output interface 20.

The recording circuit 23 includes a modulation circuit 23a and a writing control circuit 23b. The modulation circuit 23a applies a known modulation process to the write-target data WD on the basis of the extclk from the PLL circuit 19. The writing control circuit 23b outputs a writing permission signal WE which will become invalid at the end positions of frames so as to ensure that writing will be stopped at the end positions of frames even if the frequency of the extclk is varied because of, for example, failure of detecting the fcms at the timing at which they should be detected. Therefore, the recording circuit 23 outputs signals modulated by the modulation circuit to the conversion circuit 24, in accordance with writing command signals from the CPU when writing is permitted by the writing permission signal WE. The writing control circuit 23b will be described in detail later.

The conversion circuit 24 converts the modulated signals into signals to be written into the optical disc 11, and outputs the signals to the head 12.

Figure 2:
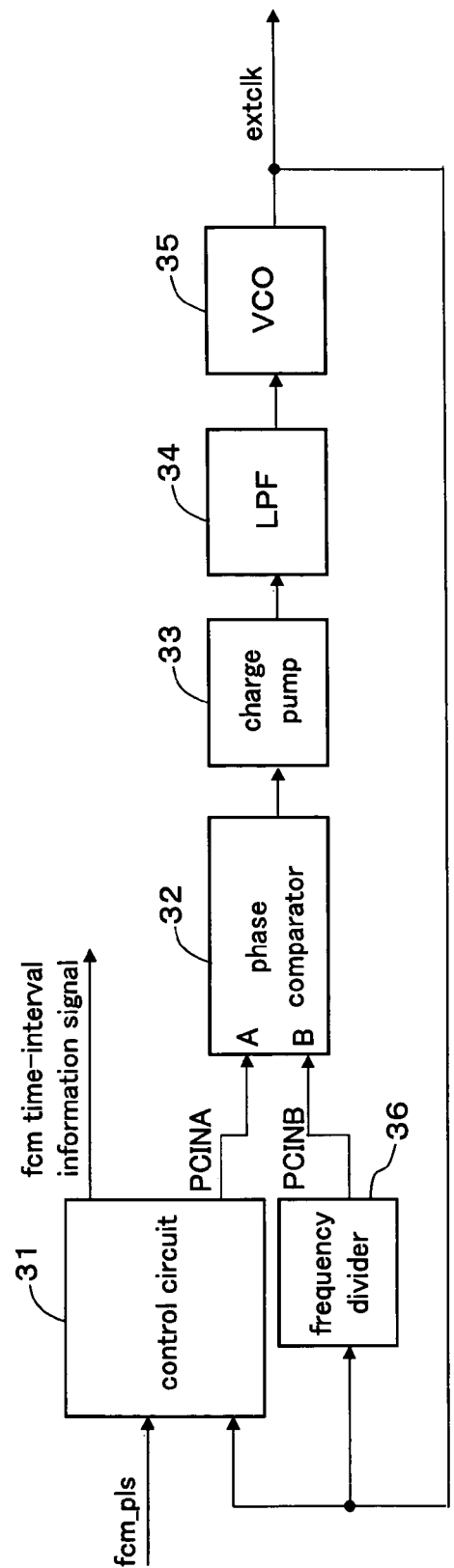
FIG. 2 is a block diagram of a PLL circuit in FIG. 1, according to the present invention.

Next, the PLL circuit 19 will be described in accordance with FIG. 2. The PLL circuit 19 includes a control circuit 31, a phase comparator 32, a charge pump 33, a low pass filter (hereinafter, referred to as an LPF) 34, a voltage-controlled oscillator (hereinafter, referred to as a VCO) 35 and a frequency divider 36.

The fcm_pls is input to the control circuit 31. The control circuit 31 delays the fcm_pls and outputs the delayed reference signal PCINA to the phase comparator 32. Further, the extclk is 1/N divided to generate a PCINB, and the PCINB is output to the phase comparator 32. The charge pump 33, the LPF 34 and the VCO 35 have the same functions as those described in JP-A 2000-173194.

The extclk which is the output of the PLL circuit is also fed back to the control circuit 31. The control circuit 31 generates an fcm time-interval information signal, using the fcm_pls and the extclk. This will be described in detail using FIG. 3.

Figure 3:
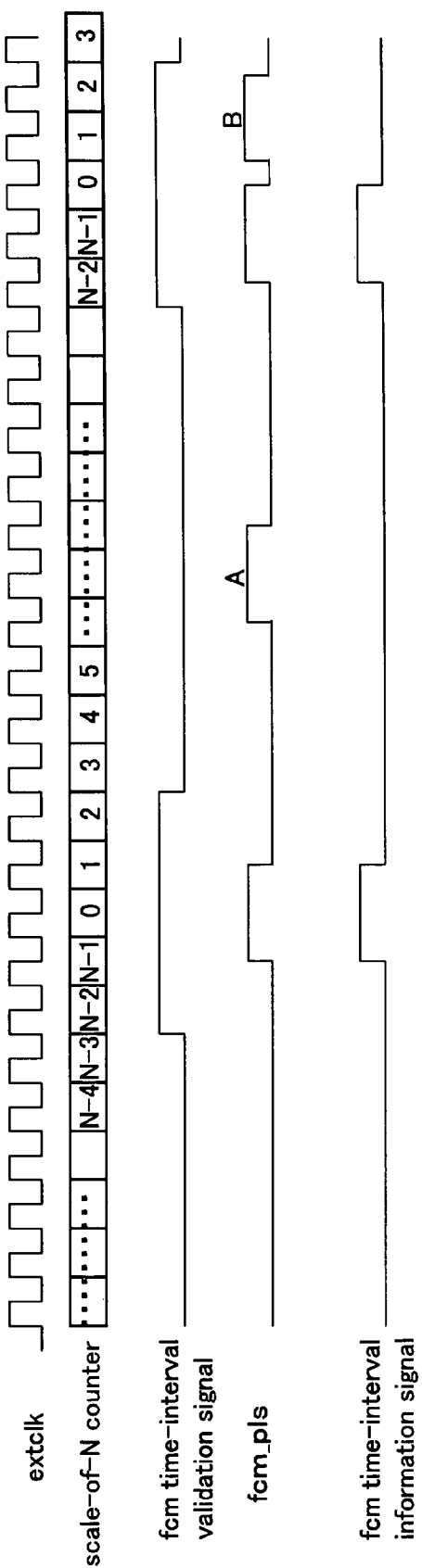
FIG. 3 is a timing chart illustrating a method for generating fcm time-interval information signals, according to the present invention.

FIG. 3 is a timing chart illustrating a method for generating an fcm time-interval information signal. The control circuit 31 includes a scale-of-N counter which operates on the basis of the extclk and increments its count value. It is assumed that an fcm_pls is expected to rise when the count value is 0. It is assumed that an fcm time-interval validation signal which is valid while the count value is from "N−2" to "2" is generated. In the case where an fcm_pls is generated when the fcm time-interval validation signal is asserted, an fcm time-interval information signal which is valid for a predetermined time interval starting at the rising edge of the fcm_pls is generated. The fcm time-interval information signal may have either the same pulse width as that of the fcm_pls or a pulse width different therefrom. The fcm time-interval information signal may rise with the same timing as the fcm_pls and may be delayed relative thereto. The fcm time-interval information signal may be modulated with various methods.

Since the fcm time-interval information signal is generated only when the fcm time-interval validation signal is valid as described above, the fcm time-interval information signal is not generated when the fcm time-interval validation signal is invalid (Refer to a pulse A in FIG. 3). Further, since only an fcm_pls detected first during the time interval in which the fcm time-interval validation signal is valid generates an fcm time interval information signal, a second pulse raised during the time interval in which the fcm time-interval validation signal is valid is ignored like a pulse B in FIG. 3. By utilizing this method, it is possible to prevent malfunctions in the event that the fcm_pls rises at a position different from the position at which it is expected to rise due to dusts or flaws.

The fcm time-interval information signal is output to the writing control circuit 23b in the recording circuit 23, together with the extclk.

Next, the writing control circuit 23b will be described. The writing control circuit 23b may be configured according to the following two embodiments.

First Embodiment

Figure 4:
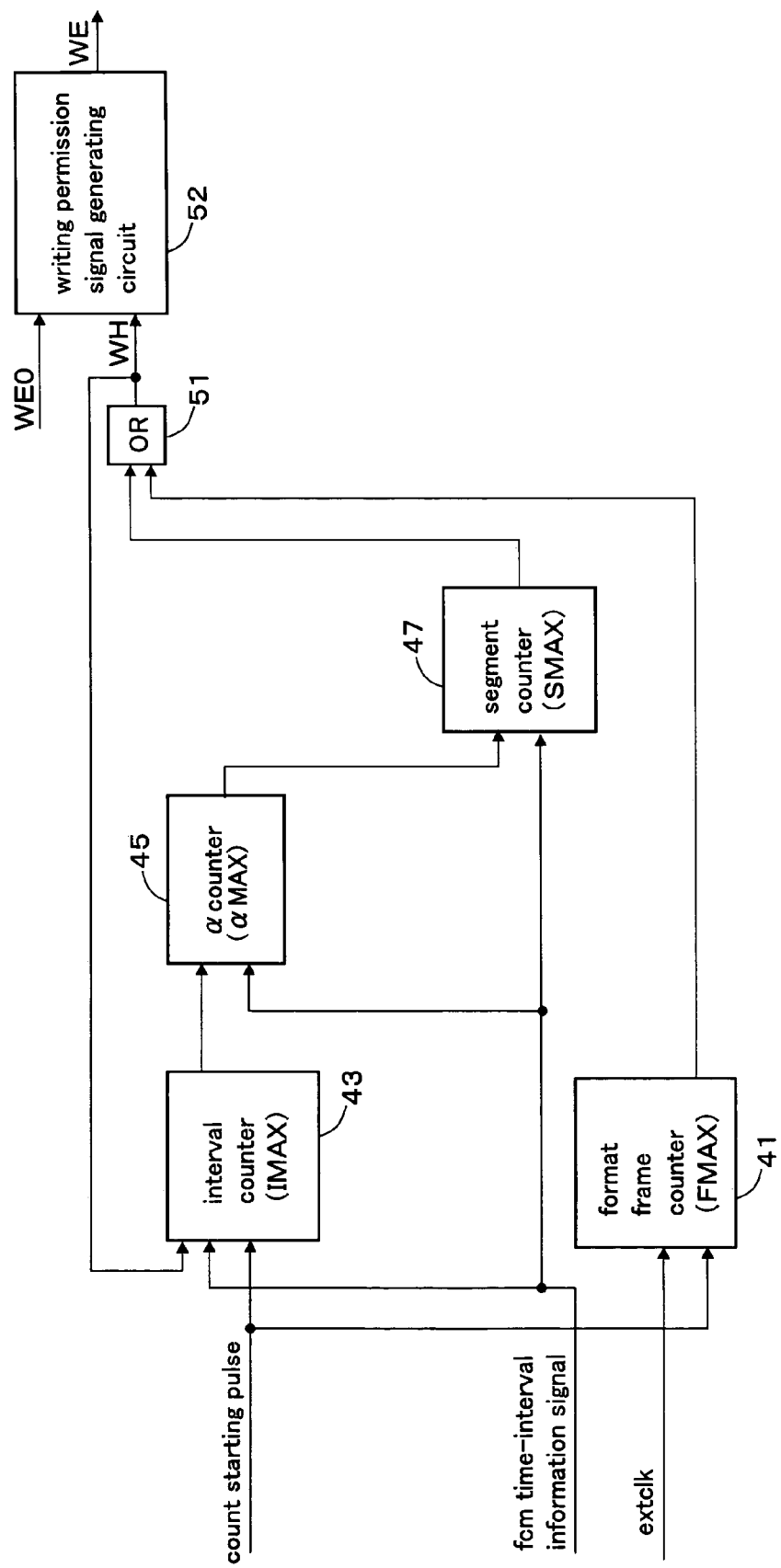
FIG. 4 is a block diagram of a writing control circuit according to a first embodiment of the present invention.
Figure 5:
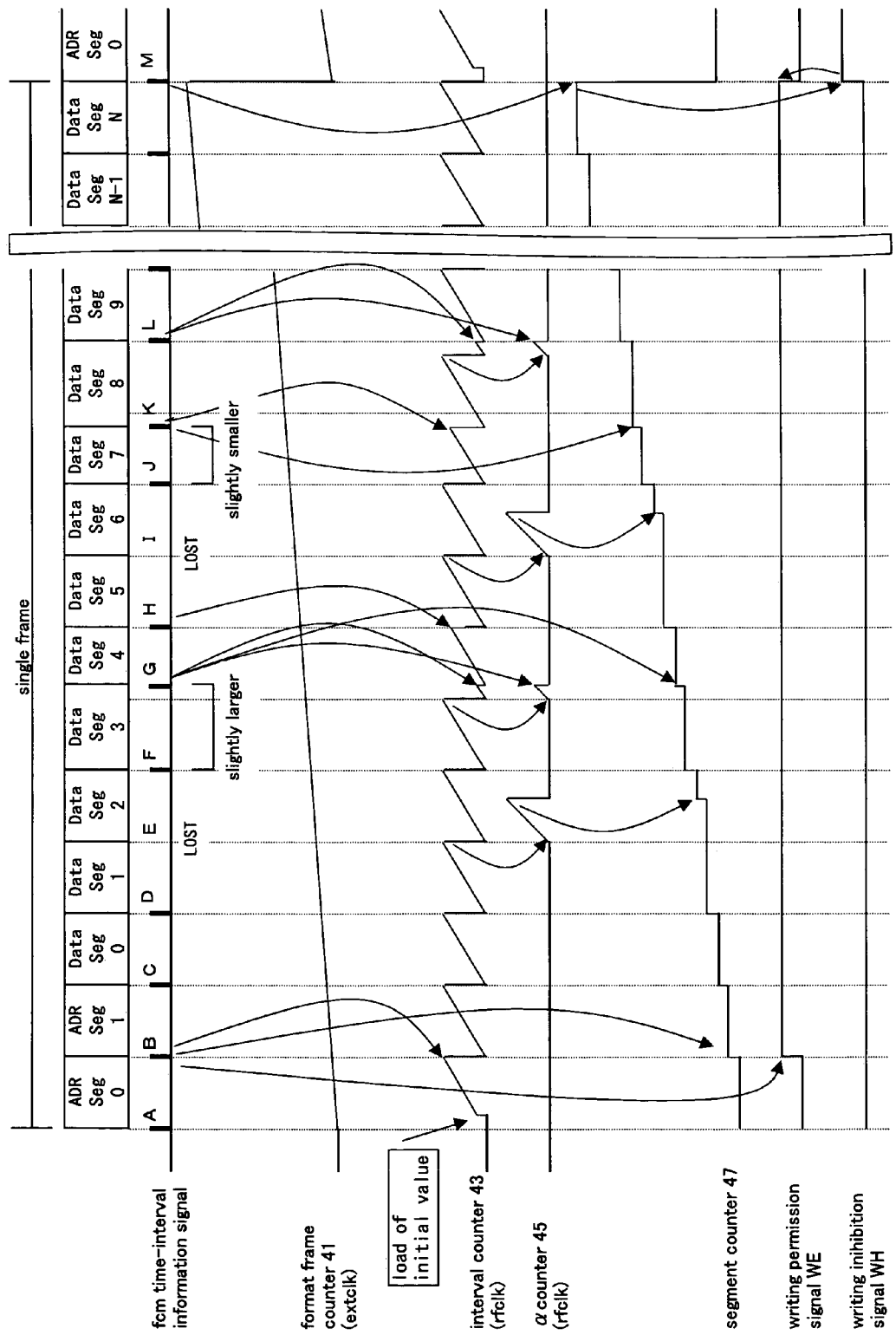
FIG. 5 is a timing chart of the writing control circuit according to the first embodiment of the present invention.
Figure 6:
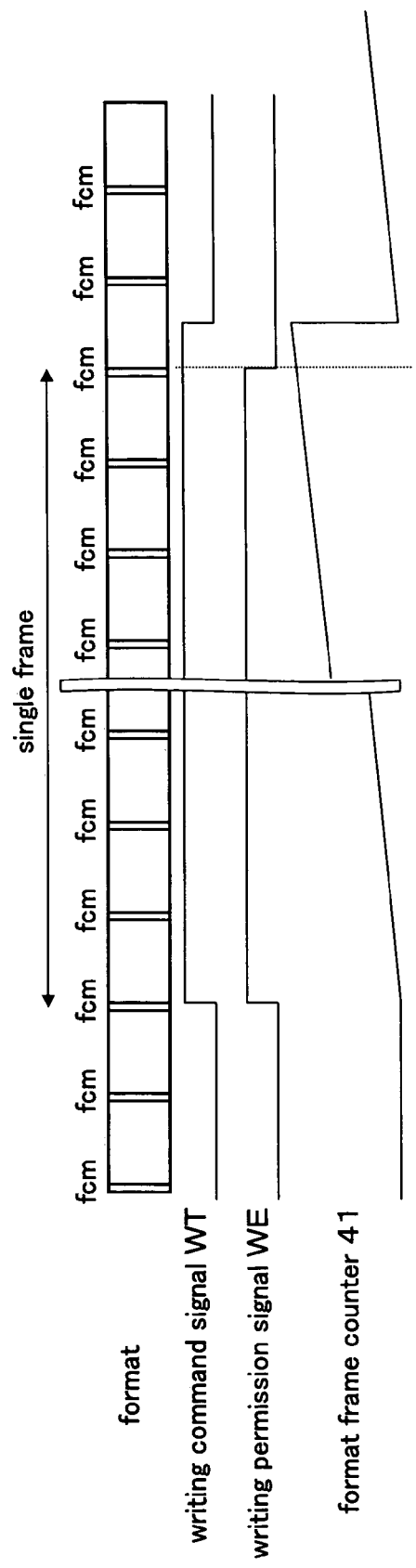
FIG. 6 is a timing chart when a frequency of an extclk is lower than usual, according to the first embodiment of the present invention.

First, a writing control circuit 23b according to a first embodiment will be described using FIGS. 4 to 6. FIG. 4 is a block diagram of the writing control circuit. FIG. 5 is a timing chart of the writing control circuit. FIG. 6 is a timing chart when the frequency of the extclk is lower than usual.

As illustrated in FIG. 4, the writing control circuit 23b includes a format frame counter 41, an interval counter 43, an α counter 45, a segment counter 47, an OR circuit 51 and a writing permission signal generating circuit 52.

The format frame counter 41 is started to operate by a count starting pulse from the CPU. The counter 41 operates with the extclk and, when it reaches a count value corresponding to the frame length (a defined value FMAX of the format frame counter 41), outputs a frame end signal to the OR circuit 51. The defined value FMAX may be either a fixed value or varied by commands from the CPU etc. By making it variable, it can be made adaptable to various medium formats. Also, instead of using the counter 41, there may be provided a pattern recognition part which outputs frame end signals to the OR circuit 51 at the end positions of frames when it detects patterns indicating the end positions of frames.

A single frame is divided by fcms, which are clock reference information, into plural segments each having a defined length. The fcms are division information. The segment counter 47 counts the number of segments and, when the count value reaches a value corresponding to the length of the frame (a defined value SMAX of the segment counter 47), outputs a frame end signal to the OR circuit 51.

When the fcm time-interval information signals which are generated from the fcms are normally generated, the segment counter 47 counts the number of fcm time-interval information signals and determines whether or not it has reached the defined value SMAX to measure the frame length. However, when fcm time-interval information signals can not be detected due to flaws or the like of the medium, the segment counter 47 will not reach the defined value SMAX even when the end position of the frame is reached. Thus, in such a case, the end position of the frame is not recognized.

In order to cope with failure of detection of fcm time-interval information signals, the interval counter 43 and the α counter 45 are employed. The interval counter 43 and the α counter 45 are operated at a constant frequency rfclk generated from the output of a crystal oscillator, a synthesizer or the like. By operating them at the rfclk, even when the frequency of extclk is lower than usual (namely, when there is an abnormality in the PLL or the like), it is possible to detect the defined time period without influences therefrom. By measuring the time period corresponding to the segment length with the rfclk, it is possible to achieve time measurement which is relatively close to that which would be obtained if the extclk were normal, even though there is a little difference therebetween.

While in this embodiment the fcms are utilized as division information which divides a frame into segments, it is possible to utilize specific patterns in medium formats which enable position recognition (synchronization patterns) or specific position information for rotation control.

The interval counter 43 counts the processing time for the segments and the fcms (almost equal to the time required for counting the number of bits of the segments and the fcms with the extclk). The counting is started (the count starting pulse) at a reference position which enables recognition of the head of a single frame of the format. The reference position is recognized by synchronization patterns etc. indicating the start of data. When the reference position occurs with a different timing from that of the fcm time-interval information signals, the interval counter 43 is loaded with an initial value before starting the counting. The interval counter 43 outputs a signal for activating the α counter 45 when the count value thereof reaches a value corresponding to the length of segments (a defined value IMAX of the interval counter 43). The interval counter 43 is reset (for example, the count value thereof is set to 0), (1) when it reaches the defined value IMAX, (2) when an fcm time-interval information signal is detected or (3) when the format frame counter 41 reaches the defined value FMAX. The interval counter 43 is stopped when the segment counter 47 or the format frame counter 41 reaches the defined value SMAX or FMAX.

The α counter 45 realizes the function of waiting for an fcm time-interval information signal being input thereto for a certain time period after the interval counter 43 has reached the defined value IMAX. The α counter 45 counts an a bit length at the rfclk, wherein the number of counts α (a defined value αMAX of the α counter 45) is defined by a signal capable of setting an arbitrary value, for example, in a resister of the CPU etc.). The defined value αMAX is set to a value corresponding to a predetermined length shorter than the length of segments (therefore, αMAX is smaller than IMAX when both the counters 43, 45 operate with clocks having the same frequency).

Further, fcm time-interval information signals are detected with varying timing. To cope with such varying timing, the α counter provides the function of waiting for an fcm time-interval information signal being detected for a constant time period. It provides this function by incrementing the count value of the segment counter 47 by plus one when the time period corresponding to the defined value αMAX has elapsed since the interval counter 43 reached the defined value IMAX.

When the α counter 45 reaches the defined value αMAX, it is determined that no fcm time-interval information signal has been detected and the count value of the segment counter 47 is incremented. The counting is started when the interval counter 43 reaches the defined value IMAX. The α counter 45 is reset and stopped (1) when an fcm time-interval information signal is detected or (2) when it reaches the defined value αMAX.

By virtue of the operations of the interval counter 43 and the α counter 45, the number of fcm time-interval information signals to be detected and the count value of the segment counter can be made equal, since the count value of the segment counter 47 is incremented even when fcm time-interval information signals can not be detected with timing with which they should be detected.

The defined values IMAX and αMAX of the interval counter 43 and the α counter 45 may be either a fixed value or variable. For example, there may be provided a buffer for storing the respective defined values and numerical values may be written therein by commands from the CPU. By making them variable, they can be made adaptable to a plurality of medium formats.

The OR circuit 51 outputs a writing inhibition signal WH to the writing permission signal generating circuit 52 when the format frame counter 41 or the segment counter 47 outputs a frame end signal to the OR circuit 51. Instead of providing the OR circuit 51, the frame end signal may be directly utilized as the writing inhibition signal WH.

The writing permission signal generating circuit 52 validates the writing permission signal WE when a writing starting signal WE0 from the CPU is valid and the writing inhibition signal WH is invalid while it invalidates the writing permission signal WE when the writing starting signal WE is valid and the writing inhibition signal WH is valid. Consequently, it is possible to forcibly make the writing permission signal WE invalid, through the writing inhibition signal WH.

In stead of providing logic circuits such as the writing permission signal generating circuit 52, the CPU may be configured to detect the writing inhibition signal WH and invalidate the writing permission signal WE.

Also, when detecting the writing inhibition signal WH, the CPU may determine that there has occurred an abnormality and may stop the operation of the device or perform rewriting.

The operation of the writing control circuit 23b will be concretely described now using the timing chart in FIG. 5. In this timing chart, there are assumed cases where (1) an fcm time-interval information signal is normally detected, (2) no fcm time-interval information signal is detected, (3) an fcm time-interval information signal is detected with a slightly-larger interval, and (4) an fcm time-interval information signal is detected with a slightly-smaller interval.

First, when a first fcm time-interval information signal A of a frame is detected, the format frame counter 41 starts counting on the basis of the extclk. The counter 41 continues counting and, when it reaches a defined value FMAX corresponding to the frame length, the counter 41 is reset and outputs a frame end signal to the OR circuit 51. After a little time has elapsed, a count starting pulse is input to the interval counter 43, and the interval counter 43 is loaded with an initial value corresponding to the elapsed time and starts counting on the basis of the rfclk. The α counter 45 and the segment counter 47 are not activated.

Next, when a signal B is detected, the interval counter 43 is reset and the count value of the segment counter 47 is incremented. With this timing, the writing permission signal WE becomes valid, thereby enabling writing into the data segment. The signal WE may become valid with any timing before writing into the data segment.

Then, similarly, each time when signals C, D are detected, the interval counter 43 is reset and the count value of the segment counter 47 is incremented.

Next, it is assumed that a signal E is not detected (illustrated in the figure as "LOST"). At this time, the interval counter 43 is reset when it reaches the defined value IMAX and activates the α counter 45. At this time, the count value of the segment counter 47 is not incremented. Then, the α counter 45 starts counting on the basis of the rfclk and, when it reaches the defined value αMAX, it is reset and increments the count value of the segment counter 47. By virtue of the effect of the α counter, the count for the undetected signal E is compensated. Namely, the count value of the segment counter 47 is made equal to that which would be obtained if the signal E were normally detected.

Next, when a signal F is detected, the interval counter 43 is reset and then the count value of the segment counter 47 is incremented.

Then, it is assumed that a signal G is generated with later timing than usual. Therefore, the interval between the signal F and the signal G is slightly larger than usual. Before the signal G is detected, the interval counter 43 reaches the defined value IMAX, is reset and activates the α counter 45. At this time, the count value of the segment counter 47 is not incremented. The α counter 45 starts counting on the basis of the rfclk. In the case where the signal G is detected during the operation of the α counter 45, the α counter 45 is reset and the count value of the segment counter 47 is incremented. At this time, the interval counter 43 is also reset.

Next, when a signal H is detected, the interval counter 43 is reset and the count value of the segment counter 47 is incremented.

Next, it is assumed that a signal I is not detected. In such a case, the operation is similar to that for the signal E.

Then, when a signal J is detected, the interval counter 43 is reset and the count value of the segment counter 47 is incremented.

Then, it is assumed that a signal K is generated with earlier timing than usual. Therefore, the interval between the signal J and the signal K is slightly smaller than usual. When the signal K is detected, the interval counter 43 is reset and the count value of the segment counter 47 is incremented.

After being reset, the interval counter 43 restarts counting and reaches the defined value IMAX before a subsequent signal L is detected. When the defined value IMAX is reached, the interval counter 43 is reset and activates the α counter 45. In the case where the signal L is detected during the operation of the α counter 45, the α counter 45 is reset and the count value of the segment counter 47 is incremented.

Finally, when a signal M at the end of the frame is detected, the segment counter 47 outputs a frame end signal to the OR circuit 51, the OR circuit 51 outputs a writing inhibition signal WH to the writing permission signal generating circuit 52, and the writing permission signal generating circuit 52 invalidates the writing permission signal WE. In the event that the signal M is not detected, similarly to the case for the signal E, the α counter 45 is activated and, when the α counter 45 reaches the defined value αMAX, the count value of the segment counter 47 is incremented, and then the segment counter 47 outputs a frame end signal to the OR circuit 51.

With the aforementioned configuration, the frequency difference between the extclk and the rfclk is eliminated each time when an fcm time-interval information signal is detected. Since it can be said that only the time for the number of bits from when the last fcm time-interval information signal near the end of the process is detected to when the writing permission signal WE is invalidated is measured using the rfclk, the error caused by the frequency difference between the extclk and the rfclk is small.

Next, there will be described the operation for cases where the frequency of the extclk is lower than usual, using the timing chart in FIG. 6.

In FIG. 6, since the writing command signal WT from the CPU and the format frame counter are controlled on the basis of the extclk, the writing command signal can not be invalidated at the end position of a single frame and the format frame counter can not detect the end position of the single frame when the frequency of the extclk is lower than usual. However, as previously described, the writing permission signal WE is invalidated exactly at the end position of a single frame, independent of the frequency of the extclk. Consequently, with the device according to the present invention, writing beyond the end position of a single frame will not occur, and it is possible to avoid a problem of corruption of data in the subsequent frame.

Second Embodiment

Next, a writing control circuit according to a second embodiment will be described, using FIGS. 7 and 8. FIG. 7 is a block diagram of the writing control circuit. FIG. 8 is a timing chart of the writing control circuit. It is preferable that the second embodiment is performed under circumstances where successive dropouts of an fcm time-interval information signal will not occur.

The block diagram of FIG. 7 is similar to the block diagram of FIG. 4, but is different therefrom in that (1) it does not include the α counter 45, (2) the defined value of the interval counter 43 is set to a count value corresponding to a predetermined length which is greater than the length of a single segment and smaller than the length of two segments (a defined value IMAX2), and (3) the count value of the segment counter 47 is incremented when the interval counter 43 reaches the defined value IMAX2.

The operation of the writing control circuit will be concretely described now, using the timing chart of FIG. 8.

First, when fcm time-interval information signals A to D are detected, the operations are similar to those in the first embodiment.

Next, it is assumed that a signal E is not detected (illustrated in the figure as "LOST"). In this case, the interval counter 43 continues the operation and reaches the defined value IMAX2 before a signal F is detected. The interval counter 43 is reset when it reaches the defined value IMAX 2 and increments the count value of the segment counter 47. By virtue of the effect of the interval counter 43, the count of the undetected signal E can be compensated. While in the first embodiment the count for undetected signals are compensated even when fcm time-interval information signals are successively undetected, in the second embodiment a second signal and the later signals are not compensated when two or more fcm time-interval information signals are successively undetected.

Next, when the signal F is detected, the interval counter 43 is reset and the count value of the segment counter 47 is incremented.

Then, it is assumed that a signal G is generated with later timing than usual. Therefore, the interval between the signal F and the signal G is slightly larger than usual. Before reaching the defined value IMAX2, the interval counter 43 detects the signal G and is reset. At this time, the count value of the segment counter 47 is incremented.

Next, when a signal H is detected, the interval counter 43 is reset and the count value of the segment counter 47 is incremented.

Next, it is assumed that a signal I is not detected. In such a case, the operation is similar to that for the signal E.

Then, when a signal J is detected, the interval counter 43 is reset and the count value of the segment counter 47 is incremented.

Then, it is assumed that a signal K is generated with earlier timing than usual. Therefore, the interval between the signal J and the signal K is slightly smaller than usual. When the signal K is detected, the interval counter 43 is reset and the count value of the segment counter 47 is incremented. After being reset, the interval counter 43 restarts counting.

Before reaching the defined value, the interval counter 43 detects a subsequent signal L and is reset and the count value of the segment counter 47 is incremented.

Finally, when a signal M at the end of the frame is detected, the segment counter 47 outputs a frame end signal to the OR circuit 51, the OR circuit 51 outputs a writing inhibition signal WH to the writing permission signal generating circuit 52, and the writing permission signal generating circuit 52 invalidates the writing permission signal WE. In the event that the signal M is not detected, similarly to the case for the signal E, the interval counter 43 reaches the defined value IMAX2 and increments the count value of the segment counter 47 and then the segment counter 47 outputs a frame end signal to the OR circuit 51.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data recording device for recording data using a synchronization clock generated on the basis of clock information formed on a recording medium, the data recording device comprising:

an interval counter;
an α counter; and
a segment counter;
wherein the interval counter and the α counter operate with a clock having a constant frequency which is independent of the clock information,
the interval counter is reset in terms of an interval count value when division information for dividing a frame into plural segments is detected and, also, is reset in terms of the interval count value and activates the α counter when the interval counter reaches an interval count value corresponding to a segment length,
the α counter is reset in terms of an α count value when the division information is detected and, also, is reset in terms of the α count value and increments a segment count value of the segment counter when the α counter reaches an α count value corresponding to a predetermined length smaller than the segment length, and
the segment counter increments the segment count value when the division information is detected and outputs a first writing inhibition signal when the segment counter reaches a segment count value corresponding to a frame length.

2. The device according to claim 1, further comprising:
a format frame counter which operates with the synchronization clock and outputs a second writing inhibition signal when the format frame counter reaches a format frame count value corresponding to the frame length.

3. The device according to claim 2, wherein
the segment count value and the format frame count value corresponding to the frame length or the interval count value corresponding to the segment length is variable.

4. The device according to claim 1, further comprising:
a pattern recognizing portion which recognizes a pattern indicating an end position of the frame and outputs a third writing inhibition signal at the end position of the frame.

5. The device according to claim 1, wherein
the α count value at which the α counter is reset is variable.

6. The device according to claim 1, wherein
the clock information is utilized as the division information.

7. The device according to claim 1, wherein
specific patterns in the frame which enable position recognition are utilized as the division information.

8. The device according to claim 1, wherein
the division information is validly detected only during a time period in which the division information is expected to be detected.

9. The device according to claim 8, wherein
only first-detected division information is validly detected during the time period.

10. The device according to claim 1, further comprising means for recognizing the first or second writing inhibition signal being output.

11. The device according to claim 1, wherein
rewriting is performed when the first or second writing inhibition signal is output.

12. A data recording device for recording data using a synchronization clock generated on the basis of clock information formed on a recording medium, the data recording device comprising:
an interval counter; and
a segment;
wherein the interval counter operates with a clock having a constant frequency which is independent of the clock information,
the interval counter is reset in terms of an interval count value when division information for dividing a frame into plural segments is detected and, also, is reset in terms of the interval count value and increments a segment count value of the segment counter when the interval counter reaches an interval count value corresponding to a predetermined length which is greater than the length of a single segment and smaller than the length of two segments, and
the segment counter increments the segment count value when the division information is detected and outputs a first writing inhibition signal when the segment counter reaches a segment count value corresponding to a frame length.

13. The device according to claim 12, further comprising:
a format frame counter which operates with the synchronization clock and outputs a second writing inhibition signal when the format frame counter reaches a format frame count value corresponding to the frame length.

14. The device according to claim 13, wherein
the segment count value and the format frame count value corresponding to the frame length is variable.

15. The device according to claim 12, further comprising:
a pattern recognizing portion which recognizes a pattern indicating an end position of the frame and outputs a third writing inhibition signal at the end position of the frame.

16. The device according to claim 12, wherein
the clock information is utilized as the division information.

17. The device according to claim 12, wherein
specific patterns in the frame which enable position recognition are utilized as the division information.

18. The device according to claim 12, wherein
the division information is validly detected only during a time period in which the division information is expected to be detected.

19. The device according to claim 18, wherein
only first-detected division information is validly detected during the time period.

20. The device according to claim 12, further comprising means for recognizing the first or second writing inhibition signal being output.

21. The device according to claim 12, wherein
rewriting is performed when the first or second writing inhibition signal is output.

* * * * *

UNITED STATES PATENT AND TRADEMARK OFFICE
CERTIFICATE OF CORRECTION

PATENT NO. : 7,471,600 B2 Page 1 of 1
APPLICATION NO. : 11/146265
DATED : December 30, 2008
INVENTOR(S) : Katsuhiko Fukuda It is certified that error appears in the above-identified patent and that said Letters Patent is hereby corrected as shown below:

Col. 13, line 26, delete "segment;" and insert --segment counter;--.

Signed and Sealed this

Twelfth Day of May, 2009

JOHN DOLL
*Acting Director of the United States Patent and Trademark Office*